INVENTORS
KLAUS PÖSCHL
WERNER VEITH

INVENTORS
KLAUS PÖSCHL
WERNER VEITH
BY *Steel & Steel* ATTORNEYS

United States Patent Office 3,506,866
Patented Apr. 14, 1970

3,506,866
HOLLOW ELECTRON BEAM GENERATOR HAVING CATHODE OF ROTATIONAL GENERATION WHOSE SURFACE COINCIDES WITH MAGNETIC FLUX
Klaus Poschl, Furth, and Werner Veith, Munich, Germany, assignors to Siemens Aktiengesellschaft, Munich, Germany, a corporation of Germany
Filed Apr. 20, 1967, Ser. No. 632,406
Claims priority, application Germany, Apr. 26, 1966, S 103,410
Int. Cl. H01j 29/46
U.S. Cl. 313—84                     6 Claims

ABSTRACT OF THE DISCLOSURE

A system for the production of a hollow electron beam for transit-time tubes, in particular travelling-wave tubes of high power, having a cathode of rotational generation with an outer emission surface which converges in beam direction, and an accelerator electrode having rotary symmetry coaxially surrounding the cathode, the latter being disposed in a magnetic field with an axial induction proceeding in beam direction, such magnetic field being inhomogeneous with a field intensity increasing in beam direction, the emission surface of the cathode coinciding substantially with the magnetic lines of force existing at the location of the cathode.

---

This invention relates to a system for the production of a hollow electron beam for transit-time tubes, in particular for travelling-wave tubes of high power, with a cathode in the form of a body of rotary generation with an outer surface, converging in beam direction, as the emission surface and an accelerator electrode presenting rotary symmetry, coaxially surrounding the cathode in which arrangement the cathode is disposed in a magnetic field with an axial induction proceeding in beam direction.

As is a well known fact, in many cases electron beams with high perveance are required for transit-time tubes, in which perveance may be defined as the ratio of the beam current to the 3/2 power of the beam voltage. Basically, a higher perveance can be obtained with a hollow electron beam than with a solid electron beam because in the case of the hollow beam, the potential difference between the interior of the beam and the beam edge is smaller than in the case of the full beam.

A system for the production of electron beams with high perveance for transit-time tubes is known from the German published application 1,008,417, which contains a conical cathode constructed in the form of a rotationally symmetrical body, which cathode is coaxially surrounded by a truncated-cone-shaped accelerator electrode. In this arrangement, a homogeneous magnetic field is provided, the lines of force of which proceed in beam direction. A strong magnetic-field component perpendicular to the cathode surface then results because of the conical shape of the cathode. The truncated-cone-shaped accelerator electrode is so proportioned that its smallest diameter is equal to or larger than the largest diameter of the emitting part of the cathode.

Furthermore, it is known from French Patent 1,342,-263 to strive for a small gradient angle between the cathode surface and the magnetic lines of force of the homogenous field in a system for the production of a hollow electron beam with a conical cathode which is located in a homogeneous magnetic field. However, there remains a magnetic-field component perpendicular to the emission surface of the cathode as long as the angle between the cathode surface and the magnetic lines of force deviates from zero. On the other hand, it is also already a known procedure to construct the cathode in electron guns of the type illustrated in the mentioned French patent exactly cylindrical with an emission surface parallel to a homogeneous magnetic-field pattern (with regard to this, French additional Patent 80,996 may be compared with German Patent 1,294,822 as well as "IRE Transactions on Electron Devices," 1962, pages 1 to 11). This arrangement results, however, in a very irregular current density distribution over the length of the cathode surface and in addition to this exhibits considerable beam noise.

As far as the described known systems for the production of a hollow electron beam contain a magnetic field component perpendicular to the emission surface of the cathode, the result is, indeed, a relatively small internal noise of the electron beam, but not an electron beam of the kind of the so-called Brillouin beam. Here "Brillouin beam" is defined as an electron beam in which the electrons have a uniform speed in beam direction over the cross-section of the beam, and in which case the following requirements are to be met for a a hollow beam. First, that the current density decreases only insignificantly with the radius of the cross-section of the beam. Further, that the rotary motion at the inner edge of the beam equals zero and the rotary motion of the outer edge of the beam is so large that the rotary energy of the electrons there located is equal to the excess of potential energy with respect to the interior of the beam. These requirements cannot be met if a magnetic field component is present perpendicularly to the cathode surface emitting the respective electron flow, unless the cathode were spotshaped or a circular line. In electron guns with limited cathode surface for the production of a Brillouin beam, the cathode generally has been disposed externally of a magnetic field and efforts made to have a magnetic field for the focused guidance of the electron beam set in as abruptly as possible, in beam direction, behind the cathode surface.

The invention is based upon the realization that the electron beam of highest-frequency tubes is supposed to have a forward speed of the individual electrons constant over the cross-section of the beam in order to be able to influence all of the electrons to the same extent during the modulation of the electron beam. Proceeding from this knowledge, it is the purpose of the invention to create a beam production system for transit-time tubes which permits, with simple means, the production of a high-perveance hollow electron beam with low noise level and with uniform forward speed. In order to solve this problem, it is proposed according to the invention for a system of the kind initially mentioned that the magnetic field in which the cathode is located be inhomogeneous with a field intensity increasing in beam direction and that in this magnetic field the emission surface of the cathode substantially coincides with the magnetic lines of force existing at the location of the cathode.

A system according to the invention has, first of all, the advantage that a strictly homogeneous magnetic field is not required, which in practice can hardly be realized, at the location of the cathode, but instead a magnetic field with strongly increasing field intensity is sought. Such a magnetic field can be obtained without difficulties with a magnet pole symmetrically enclosing the system axis, which magnet pole can be preferably assigned to a front side of a permanent magnet system for the production of a magnetic field, in particular homogeneous. Because of the requirement that the effective cathode surface should coincide with the immediately adjacent magnetic field lines, the cathode can have a large surface without endangering the prerequisite for an electron beam with uniform speed in axis direction, that is to say the absence of a magnetic field component perpendicular to the cathode surface. Simultaneously, the magnetic field tangential to the cathode surface has a strong focusing effect upon the emitted electron flow, as a result of which the electrons are essentially drawn away from the cathode surface so that beam noise is very limited.

In order to exclude a rotary motion of the electrons at the inner edge of the beam during the transition of the inhomogeneous magnetic field, in which the cathode is disposed, into a homogeneous magnetic guidance field, it is proposed according to a further feature of the invention to provide additional electron-optical means in electron beam direction behind the cathode, which means adjusts the inner edge of the hollow electron beam to the course of the magnetic lines of force which extend tangentially with respect to the cathode surface. In especially simple manner, these electron-optical means may comprise the feature that between the cathode and the homogeneous magnetic field, the field intensity of the inhomogeneous magnetic field runs through a maximum of suitable size.

The invention will be explained in greater detail in connection with the drawings in which like reference characters designate like or corresponding parts, and in which.

Figure 1:
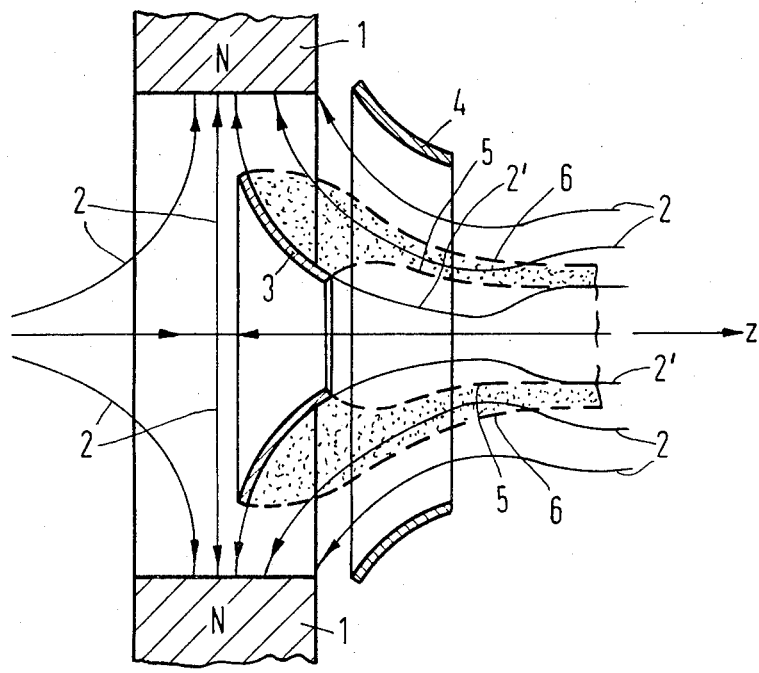
FIGURE 1 is an axial section of an electron beam-producing system in accordance with the invention.
Figure 2:
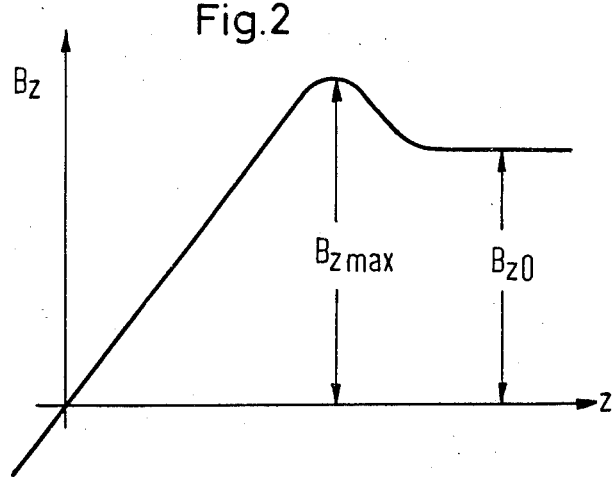
FIGURE 2 is a chart of the axial magnetic induction in the structure of FIGURE 1, oriented with respect thereto.

FIGURE 1 schematically illustrates a cross-section through an electron beam production system according to the invention, the accompanying course of the axial magnetic induction $B_z$ being shown in FIGURE 2 and oriented with the structure of FIGURE 1. The reference numeral 1 designates a pole piece which is rotationally symmetrical, surrounding the system axis coaxially, and is intended to represent the extension of the pole of a permanent magnet, for example the north pole. The pole piece 1 generates a so-called magnetic saddle-point field such as indicated by means of lines 2. Disposed in this magnetic field is a cathode 3, likewise rotationally symmetrical, which is constructed with a rotary generation and has an outer surface in converging direction, which forms the emission surface. According to the invention, the curvature of this emission surface coincides with one of the magnetic lines of force 2. It therefore follows that no magnetic field intensity component perpendicular to the cathode surface exists at the immediate cathode surface, and consequently, the requirement of an electron flow with uniform axial speed is achieved.

The cathode 3 is surrounded by an anode 4, likewise constructed symmetrically with respect to rotation. The shape of this anode 4 is so selected that in consideration of the occurring space charge, the electrical field intensity is constant on the entire effective cathode surface. Because of this, a uniform emission of the cathode is assured. Immediately after leaving the cathode surface, the electrons emerging from cathode 3 and forming the emission are exposed to a relatively strong magnetic field, and during this process wind around the magnetic lines of force 2 so that a hollow electron beam with a beam edge, indicated by the dotted lines 5 and 6, results.

It will be apparent from FIGURE 1 that the inner beam edge 5 of the hollow beam also intersects magnetic lines of force. Consequently, according to Busch's theorem, the electrons located at the inner edge of the beam must also execute a rotary action. In order to obtain a hollow beam with electrons proceeding strictly straight ahead at the inner edge in the manner of a Brillouin beam in spite of this fact, the magnetic field is constructed in such a manner that lines of force 2' starting from the cathode surface describes a dip in relation to the system axis z until the rising branch of this dip remote from cathode 3 with the hollow beam, encloses an angle of zero. Such a magnetic field presents the course of the axial magnetic induction $B_z$ as function of the distance z, as will be evident from FIGURE 2, in which case the induction $B_z$ passes through a maximum $B_{zmax}$ between the inhomogeneous field existing at the location of the cathode and a homogeneous magnetic field $B_{zo}$ serving for the focused guidance of the concentrated hollow electron beam. This maximum of the axial magnetic induction corresponds to the z location at which the magnetic lines of force 2 or 2' in FIGURE 1 have their smallest distance from the system axis z. A magnetic field with such a course of the induction $B_z$ is known in the production of magnetic focusing fields for electron beams and can be easily produced. In order to avoid disturbances of the magnetic field within a tube with a system according to the invention, it is recommended to keep the space containing the electron gun free from parts of soft-magnetic material.

Figure 3:
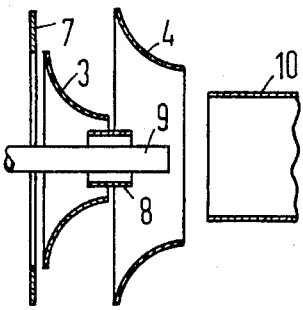
FIGURE 3 is similar to FIGURE 1, illustrating another embodiment of the invention.

It might be mentioned that a hollow electron beam produced with a system according to the invention differs from the classic Brillouin hollow beam by the feature that the current density lateral to the beam axis is not constant and the known screening constant K is not zero but has the value 1 at the inner edge of the beam and still has a finite value at the outer edge of the beam. The uniform forward speed, however, is a feature which it has in common with the Brillouin hollow beam, the electrons located at the inner edge of the hollow beam not executing a rotary motion, while the electrons at the outer edge of the beam rotate in correspondence to their potential energy which is higher in comparison with the inner edge of the beam. In order to be able to attain these beam qualities, an additional electrostatic focusing can be expediently provided behind the cathode by means of an electric transverse field in the course of the electron beam. FIGURE 3 schematically illustrates a cross-section through such a beam production system. The conical cathode 3 and anode 4 are supposed to again be disposed in a strongly inhomogeneous magnetic field in accordance with FIGURE 1. Reference numerals 7 and 8 designate Wehnelt electrodes. In addition to these electrodes, a cylindrical focusing electrode 9 is provided which is coaxially surrounded by the conical cathode 3 and which extends beyond the cathode along the system axis z. In this arrangement, the central focusing electrode 9 is supposed to end in beam direction behind cathode 3 at the point where the magnetic field intensity maximum $B_{zmax}$ of FIGURE 2 exists. In this manner, the shooting of the hollow electron beam into the travel space beginning with the electrode 10 can be corrected at any time by merely changing the voltage, which possibility for correction is advantageous in any electron gun.

An electron gun according to the invention can, if required, be designed for hollow beams of arbitrary diameters and current intensities. For example, when using a hollow electron beam in transit-time tubes, a hollow beam with small wall thickness (difference between inner diameter and outer diameter) is not desired in any case. In this respect, by selection of the width of the pole piece 1 (FIGURE 1) and of the distance of anode 4 from cathode 3, it is possible to produce hollow beams of the desired shape and current intensity.

Figure 4:
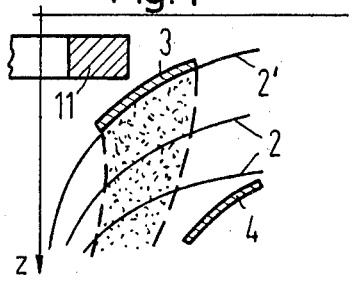
FIGURES 4 and 5 are figures corresponding to FIGURES 1 and 2, respectively, of another embodiment.
Figure 5:
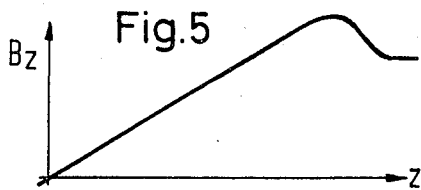
Figure 6:
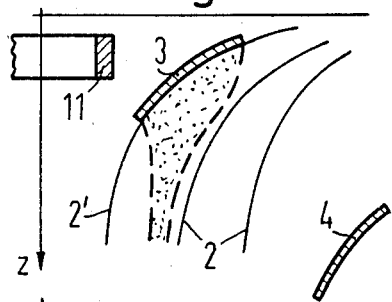
FIGURES 6, 7, 8, 9, 10 and 11 illustrate still further embodiments of this invention and the respective characteristics of the axial magnetic induction with respect thereto.
Figure 7:
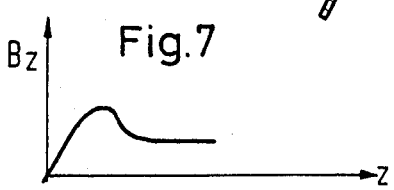
Figure 8:
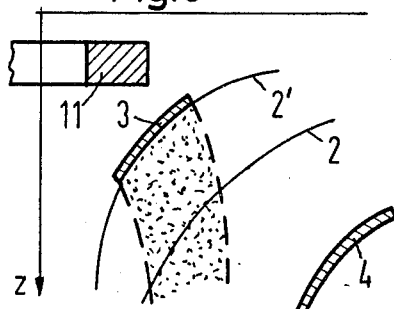
Figure 9:
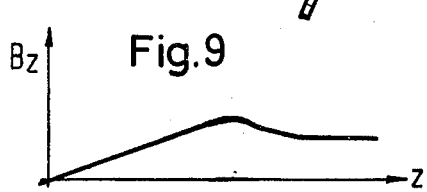
Figure 10:
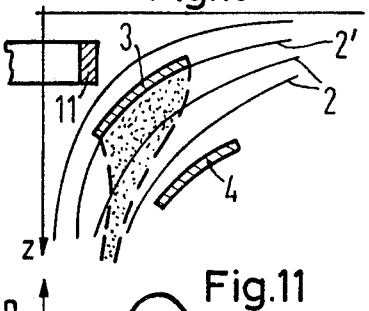
Figure 11:
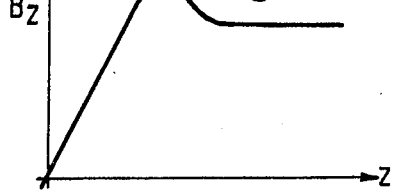

If the pole piece 1 in FIGURE 1 has a large extension in the direction of the system axis z, a hollow electron beam of large wall thickness will be obtained. The anode 4 then has to be disposed relatively close to cathode 3 if a high current intensity is to be obtained. FIGURE 4 schematically illustrates an embodiment of the invention proportioned in such a manner, in which case a magnetic field $B_z$ according to FIGURE 5 is to be present. In addition to this, in FIGURE 4, reference numeral 11 designates the wall thickness of the concentrated electron beam in schematic manner. FIGURES 6 and 7 illustrate in the same type of representation an electron gun which supplies a hollow beam with a relatively small current intensity of the beam and small wall thickness. In this case, anode 4 is disposed at a large distance from cathode 3. Finally, in FIGURES 8 and 9, and FIGURES 10 and 11, proportions are depicted which result in a hollow electron beam of small current intensity and large wall thickness (FIGS. 8 and 9) or in a large current intensity and small wall thickness (FIGS. 10 and 11). In practice, the correct geometry of these arrangements can be easily determined by means of the known test methods in an electrolytic tank.

A system according to the invention combines in itself a series of advantages. The desired magnetic field course can be easily produced and can be adjusted outside the tube. Likewise, the requirements for the production of a hollow electron beam, without an inner electrode, having uniform forward speed can be met without difficulties, in which case the shoot-in conditions of the electron beam can be very easily corrected by regulation of the magnetic field course and, if required, by electrostatic focusing means. Furthermore, as the electrons emerging from the cathode are focused very early in direction of the system only a relatively small space charge arises at the immediate cathode surface which practically does not influence the beam formation at all and therewith does not contribute to noise in the beam. As for the rest, all of the advantages exhibited by the described known systems are retained, which comprise, for example, the feature that a large cathode surface may be employed making it possible to use oxide cathodes for very high current intensities. In addition, in arrangements with straight paths, for example using a simple, plane, ring-shaped cathode, an advantage arises to the effect that ions forming in the discharge space do not arrive at the cathode surface, but travel through the space enclosed by the cathode to the rear thereof.

Changes may be made within the scope and spirit of the appended claims which define what is believed to be new and desired to have protected by Letters Patent.

We claim as our invention:

1. A system for the production of a hollow electron beam for transit-time tubes, particularly travelling wave tubes of high power, which include means forming a homogeneous magnetic field for the bundled guidance of the electron beam, comprising a cathode body of rotational generation with an outer surface converging in beam direction forming the emission surface, an accelerator electrode having rotary symmetry, coaxially disposed with respect to the cathode, annularly shaped means symmetrically surrounding the system axis forming a magnetic field in which said cathode is disposed, with an axial induction proceeding in beam direction whereby the magnetic field in which the cathode is located is inhomogeneous with a field intensity increasing in beam direction and having lines of force which lie substantially flush with the emission surface of the cathode, and a cylindrical focusing electrode coaxially encircled by the cathode, said focusing electrode extending longitudinally along the system axis beyond the cathode in beam direction up to a magnetic field intensity maximum which precedes the homogeneous magnetic field, such focusing electrode carrying an electrical potential which lies between cathode potential and the potential of a drift electrode surrounding the electron beam.

2. A system according to claim 1, wherein said magnetic field forming means is so constructed that the field intensity of said inhomogeneous magnetic field is so proportioned that the inner edge of the hollow electron beam conforms to a magnetic line of force.

3. System according to claim 2, wherein the accelerator electrode has such a shape that the electrical field intensity is constant on the entire effective cathode surface.

4. System according to claim 3, wherein the inhomogeneous magnetic field is produced by a pole piece symmetrically surrounding the system axis (magnetic pole) which is connected with a magnetic system for the production of the magnetic guidance field for the hollow electron beam.

5. A system according to claim 4, wherein the pole piece is proportioned in dependence upon the thickness desired in the hollow beam, the extension of the pole piece in the direction of the system axis being increased with an increase in the desired thickness of the beam.

6. A system according to claim 4, wherein the distance between the accelerator electrode and the cathode surface is determined in dependence upon the desired beam current intensity as an increasing function in such intensity.

References Cited

UNITED STATES PATENTS

| | | | |
|---|---|---|---|
| 2,632,130 | 3/1953 | Hull | 313—84 X |
| 2,936,396 | 5/1960 | Currie | 313—84 X |
| 2,943,234 | 6/1960 | Zitelli | 313—84 X |
| 2,985,789 | 5/1961 | St. John | 313—84 X |
| 3,265,925 | 8/1966 | Bodmer | 313—84 X |
| 3,315,110 | 4/1967 | Chao Chen Wang | 313—84 |

ROBERT SEGAL, Primary Examiner

U.S. Cl. X.R.

315—3.5